(12) United States Patent
Lin

(10) Patent No.: US 7,630,195 B2
(45) Date of Patent: Dec. 8, 2009

(54) ELECTRONIC APPARATUS

(75) Inventor: Chun-Wang Lin, Taipei County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 223 days.

(21) Appl. No.: 11/808,829

(22) Filed: Jun. 13, 2007

(65) Prior Publication Data

US 2008/0101003 A1    May 1, 2008

(30) Foreign Application Priority Data

Oct. 30, 2006    (TW) ............................. 95219142 U

(51) Int. Cl.
*G06F 1/16*    (2006.01)
(52) U.S. Cl. ................................. 361/679.26
(58) Field of Classification Search ............ 361/679.02, 361/679.09, 679.26
See application file for complete search history.

(56) References Cited

U.S. PATENT DOCUMENTS

| | | | |
|---|---|---|---|
| 5,534,891 A * | 7/1996 | Takano ......................... 345/169 |
| 5,543,787 A * | 8/1996 | Karidis et al. .................. 341/20 |
| 5,615,081 A * | 3/1997 | Ma ........................ 361/679.14 |
| 5,734,548 A * | 3/1998 | Park ....................... 361/679.14 |
| 5,742,475 A * | 4/1998 | Riddiford .............. 361/679.09 |
| 5,754,395 A * | 5/1998 | Hsu et al. ............. 361/679.11 |
| 5,818,360 A * | 10/1998 | Chu et al. ...................... 341/22 |
| 6,008,986 A * | 12/1999 | Mok ..................... 361/679.12 |
| 6,028,768 A * | 2/2000 | Cipolla .................. 361/679.12 |
| 6,055,153 A * | 4/2000 | Chiu et al. ............. 361/679.14 |
| 6,144,554 A * | 11/2000 | Mok ..................... 361/679.08 |
| 6,304,431 B1 * | 10/2001 | Kim ...................... 361/679.09 |
| 6,612,668 B2 * | 9/2003 | Doan ...................... 312/223.2 |
| 6,618,239 B2 * | 9/2003 | Takahashi et al. ....... 361/679.09 |
| 6,853,543 B1 * | 2/2005 | Moore et al. ........... 361/679.12 |
| 7,187,537 B2 * | 3/2007 | Liao ..................... 361/679.09 |
| 2005/0083645 A1* | 4/2005 | Moore et al. ................ 361/683 |

* cited by examiner

*Primary Examiner*—Lisa Lea-Edmonds
(74) *Attorney, Agent, or Firm*—Rabin & Berdo, PC

(57) ABSTRACT

An electronic apparatus comprising a base, a first body, a second body and at least an adjusting apparatus is provided. The first body and the second body disposed respectively at two ends of the base are rotatable relative to the base. The adjusting apparatus is coupled to the first body and the second body. When the second body rotates relative to the base within a predetermined angle, the adjusting apparatus accordingly leads the first body to rotate so as to adjust a relative angle between the first body and the base.

6 Claims, 6 Drawing Sheets

ELECTRONIC APPARATUS

This application claims the benefit of Taiwan application Serial No. 095219142, filed Oct. 30, 2006, the subject matter of which is incorporated herein by reference.

BACKGROUND OF THE INVENTION

1. Field of the Invention

The invention relates in general to an electronic apparatus, and more particularly to an electronic apparatus whose first body leads a second body by means of an adjusting apparatus.

2. Description of the Related Art

Referring to FIG. 1, a perspective of a conventional notebook computer is shown. As indicated in FIG. 1, the notebook computer 100 comprises a host body 110 and a monitor body 120. The monitor body 120 could rotates relative to the host body 110 in the direction of an arrow A such that a user can adjust the angle of the monitor body 120, close the monitor body 120 to cover the host body 110, or open the monitor body 120 from the host body 110.

The host body 110 is the main source of heat generated in the notebook computer 100. However, the dissipation fan disposed inside the notebook computer cannot effectively dissipate the heat when the host body 110 is placed on a desktop almost without any gap. Besides, the keyboard module 111 is normally horizontally disposed on the host body 110, and such design is lack of ergonomic considerations. In order to achieve a suitable angle for the keyboard module 111, the user has to change the disposition through trial and error such as inserting an object under the host body 110 or installing flexible legs to the host body 110. Therefore, the conventional notebook computer 100 has the disadvantages of poor heat dissipation and inconvenient usage.

SUMMARY OF THE INVENTION

The invention is directed to an electronic apparatus. By means of an adjusting apparatus, the electronic apparatus, such as a notebook computer, automatically adjusts the angle of the host body when the monitor body is opened from or closed to the host body. Compared with conventional notebook computer, the notebook computer of the invention has better dissipation and is much more user-friendly.

According to an aspect of the present invention, an electronic apparatus comprising a base, a first body, a second body and at least an adjusting apparatus is provided. The first body and the second body disposed respectively at two ends of the base are rotatable relative to the base. The adjusting apparatus is coupled to the first body and the second body. When the second body rotates relative to the base within a predetermined angle, the adjusting apparatus accordingly leads the first body to rotate so as to adjust a relative angle between the first body and the base.

The invention will become apparent from the following detailed description of the preferred but non-limiting embodiments. The following description is made with reference to the accompanying drawings.

DETAILED DESCRIPTION OF THE INVENTION

Figure 1:
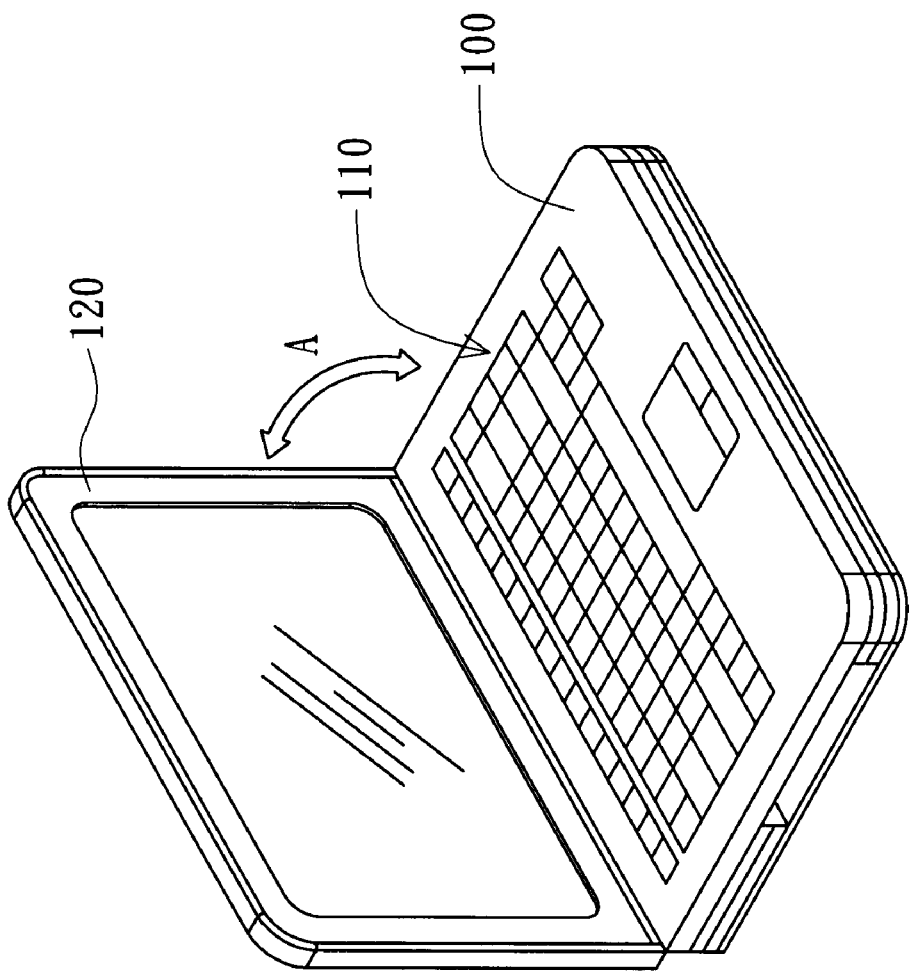
FIG. 1 (Prior Art) is a perspective of a conventional notebook computer.
Figure 2A:
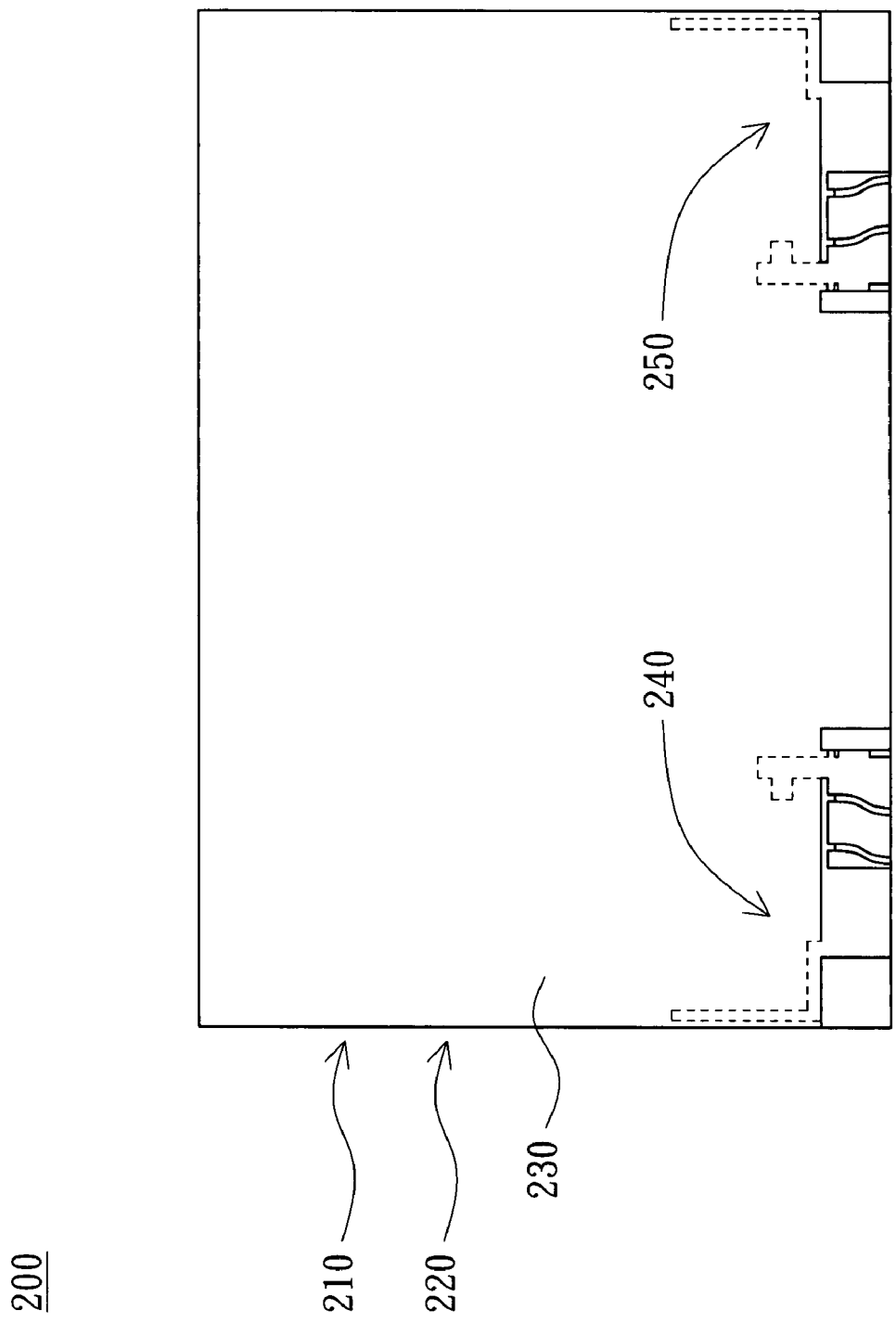
FIG. 2A is a top view of an electronic apparatus according to a preferred embodiment of the invention.
Figure 2B:
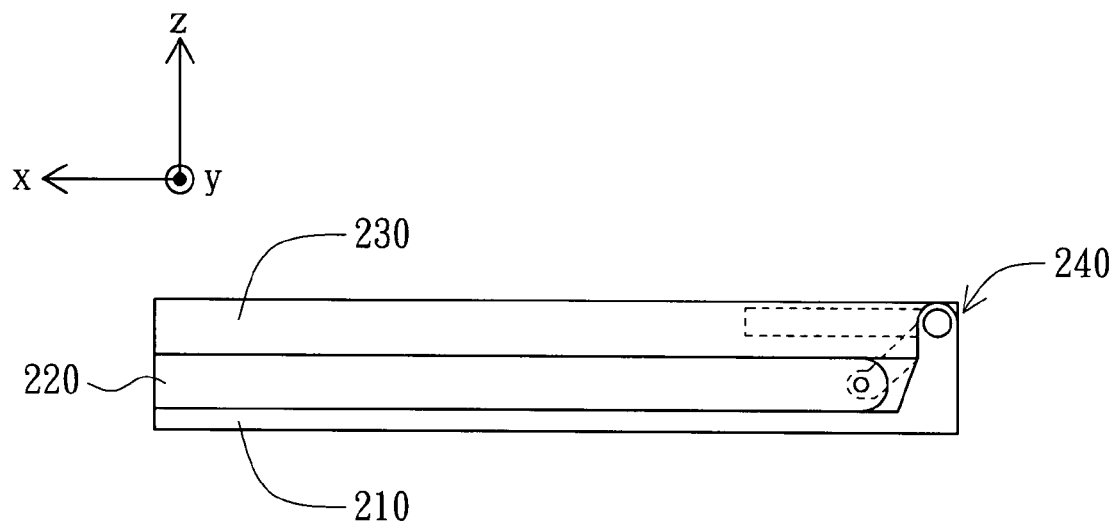
FIG. 2B and FIG. 2C are two side views of FIG. 2A.
Figure 2C:
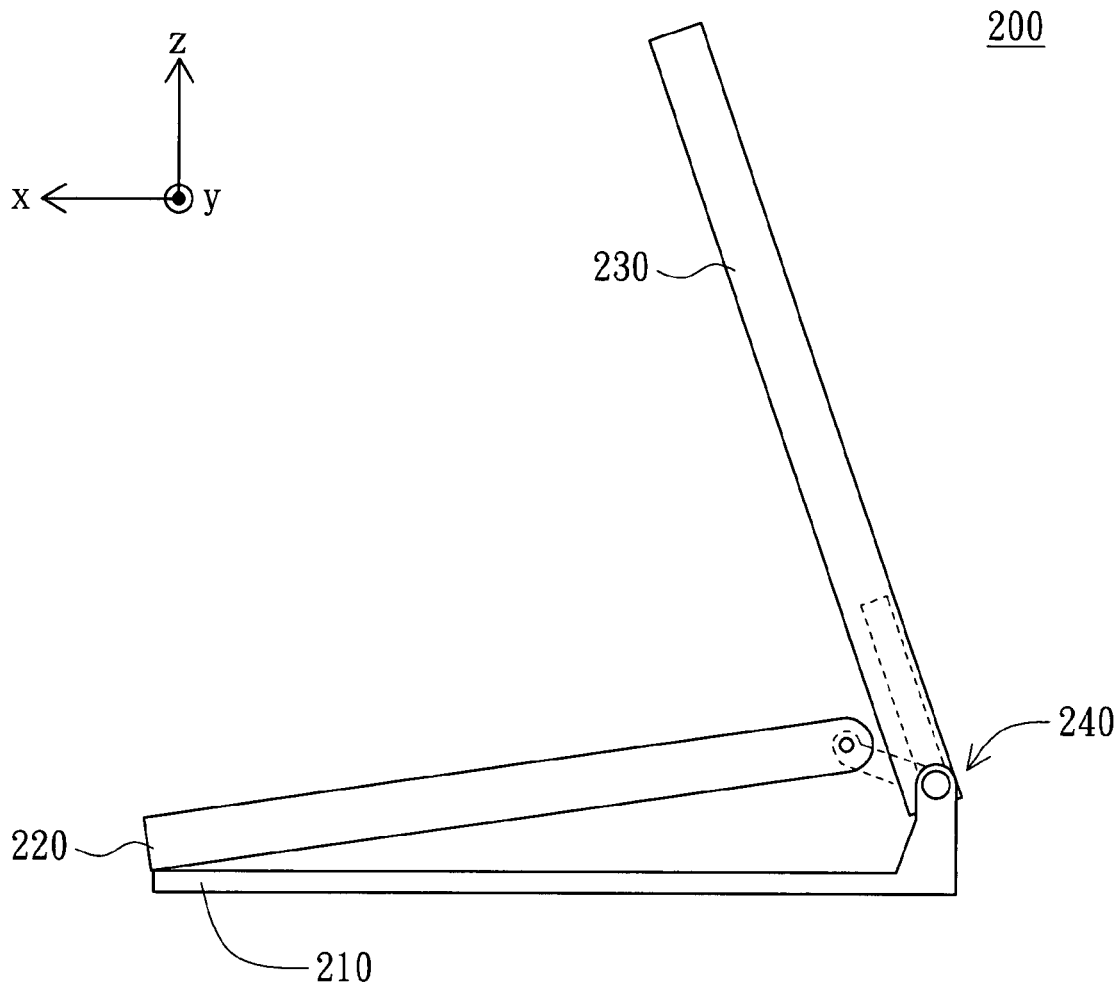

Referring FIGS. 2A~2C. FIG. 2A is a top view of an electronic apparatus according to a preferred embodiment of the invention. FIG. 2B and FIG. 2C are two side views of FIG. 2A. The electronic apparatus 200 is exemplified by a notebook computer comprising a base 210, a first body 220, a second body 230 and two adjusting apparatuses 240 and 250. In the present embodiment of the invention, the first body 220 is exemplified by a conventional host body comprising a keyboard module, and the second body 230 comprises a monitor for displaying a frame. The adjusting apparatuses 240 and 250 are both coupled to the first body 220 and the second body 230.

As indicated in FIG. 2B and FIG. 2C, the first body 220 and the second body 230 are disposed respectively at two ends of the base 210 by ordinary bearing structure, so as to rotate relative to the base 210 in the +x or the −x direction. In FIG. 2B, the first body 220 and the second body 230 are closed together. When the user opens the second body 230 comprising the monitor, the second body 230 rotates relative to the base 210 clockwise and achieves the state shown in FIG. 2C. Meanwhile, the adjusting apparatuses 240 and 250 accordingly lead the first body 220 to rotate anti-clockwise from the state shown in FIG. 2B to the state shown in FIG. 2C, thereby adjusting the relative angle between the first body 220 and the base 210.

In FIG. 2C, the heat generated in the first body 220 by the main heat sources such as the main circuit board and the power supplier is well dissipated and overcomes the problem of heat accumulated due to that the first body 220 closely contact with the desk top for a long duration. Besides, the design of the invention further enables the adjusting apparatuses 240 and 250 to be fixed at a supporting angle relative to the first body 220 after the second body 230 is rotated to a predetermined angle, such that the user is able to use the keyboard module disposed on the first body 220 under a user-friendly environment. Related designs of the mechanism between the adjusting apparatus 240 and the first body 220 as well as the second body 230 are elaborated below with accompanied drawings. The adjusting apparatus 250 being a symmetric design with respect to the adjusting apparatus 240 is understandable to any one having common sense and is not repeated here.

Figure 3A:
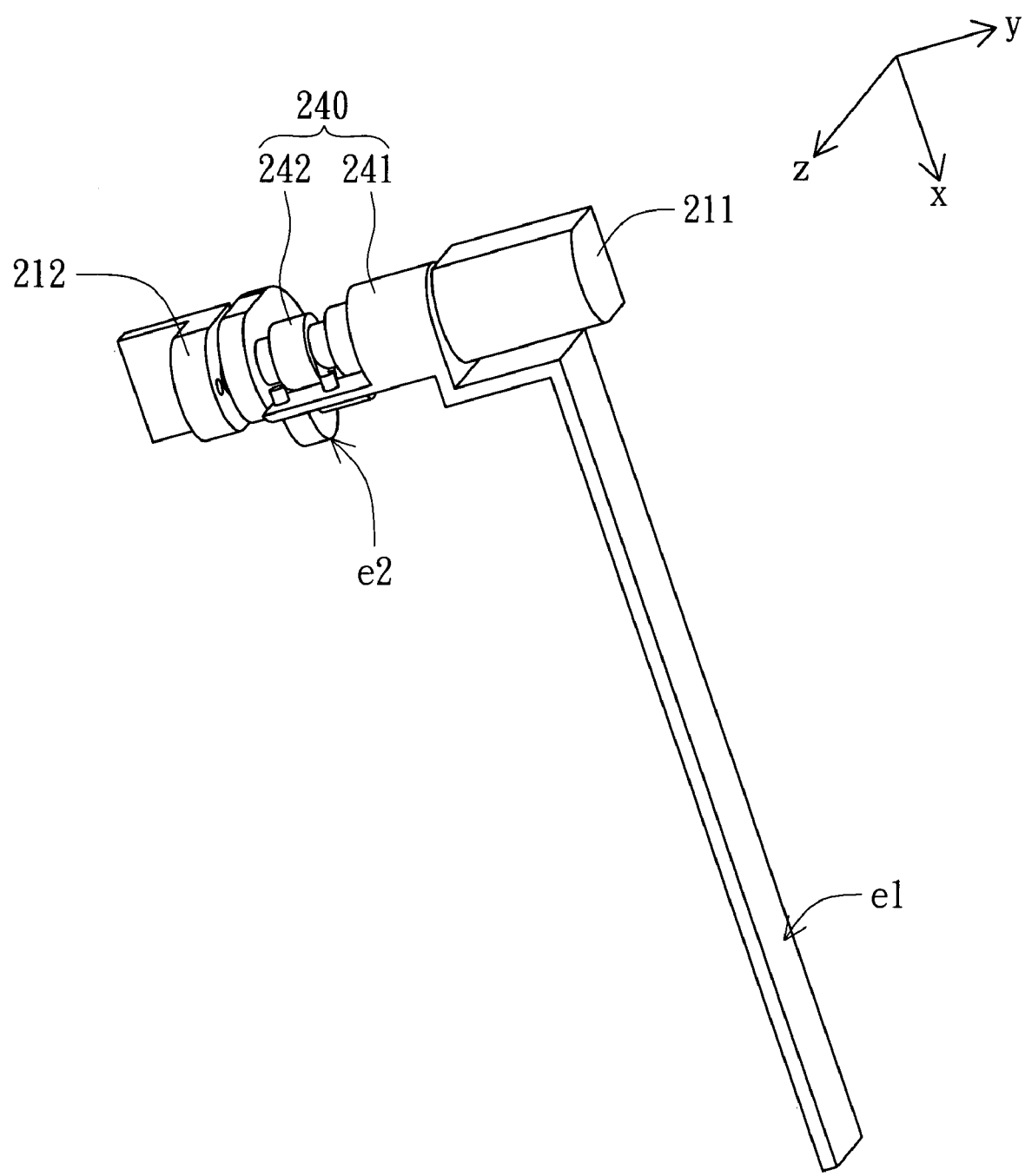
FIG. 3A is a perspective of an adjusting apparatus according to a preferred embodiment of the invention.
Figure 3B:
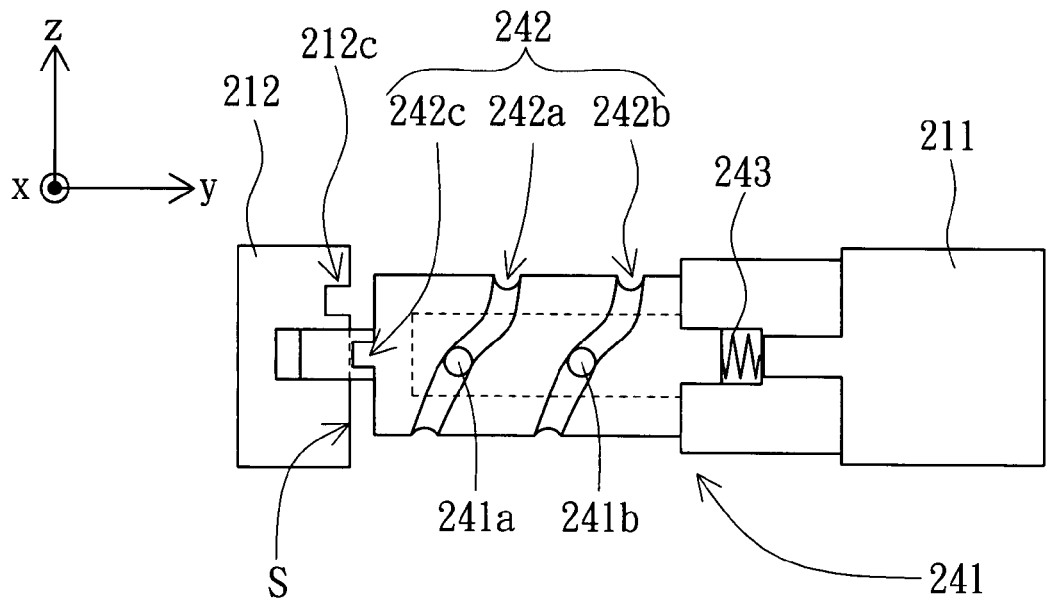
FIGS. 3B~3D are three cross-sectional views of FIG. 3A.
Figure 3C:
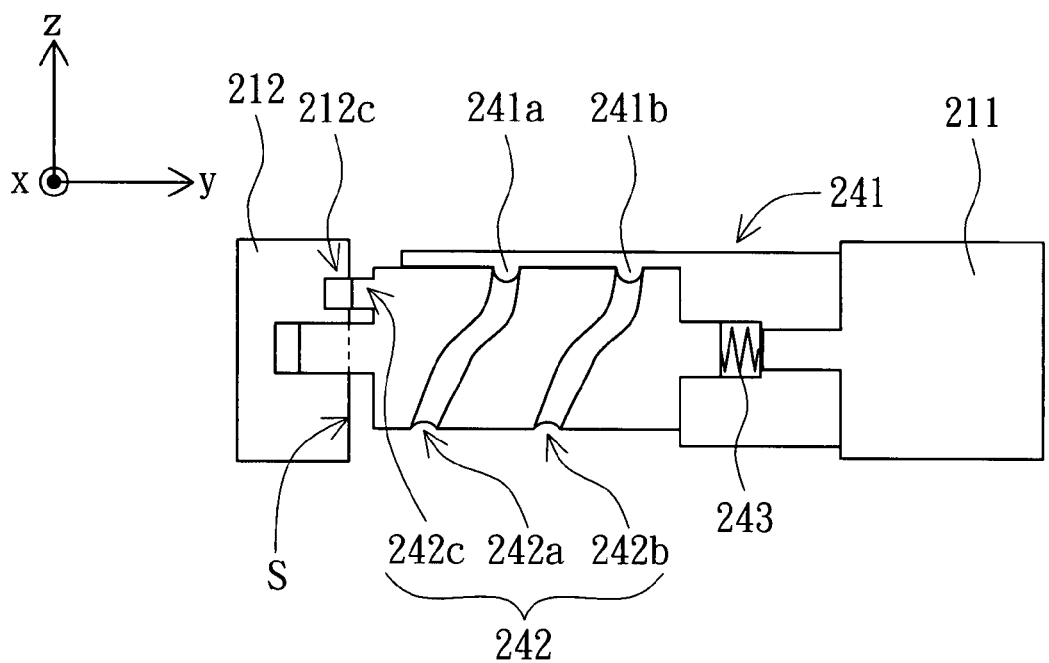
Figure 3D:
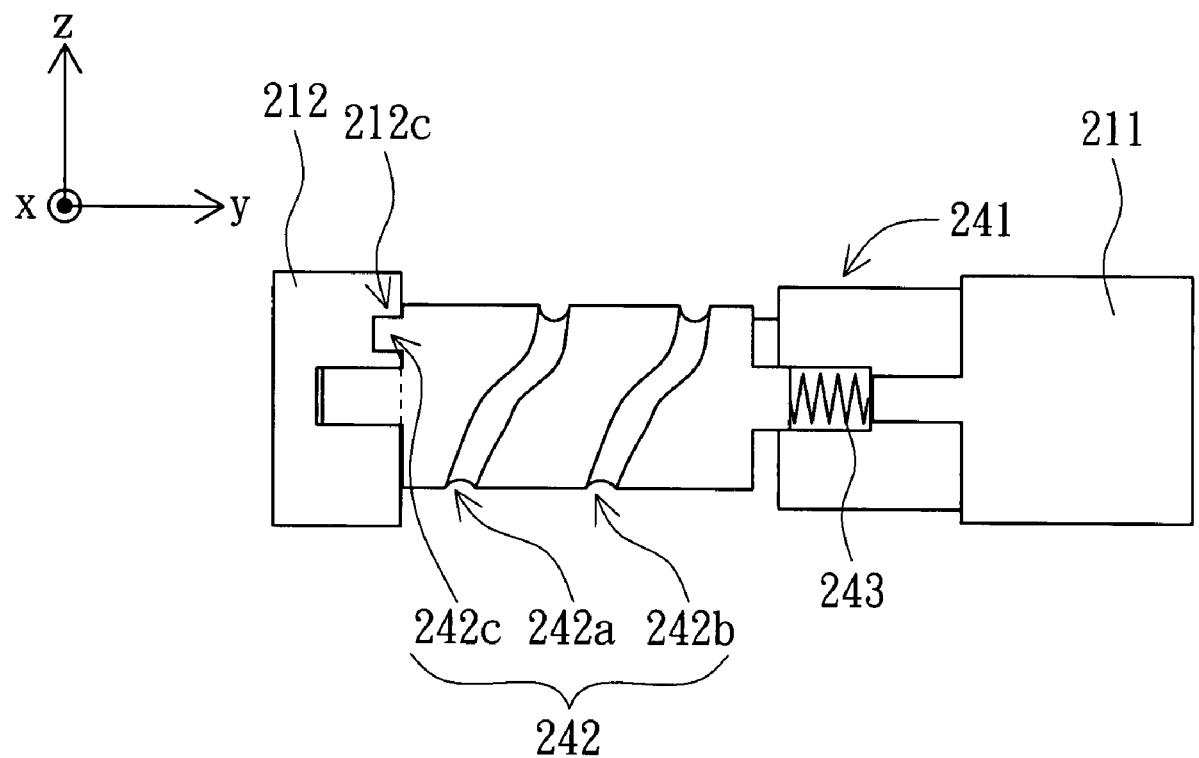

Referring to FIGS. 3A~3D. FIG. 3A is a perspective of an adjusting apparatus 240 according to a preferred embodiment of the invention. FIGS. 3B~3D are three cross-sectional views of FIG. 3A. The adjusting apparatus 240 is a bearing structure disposed on the base 210 and located between the first pivot section 211 and the second pivot section 212. The adjusting apparatus 240 comprises a coupling member 241, a supporting member 242 and an elastic member 243. The coupling member 241 is pivotally connected to the first pivot section 211. The coupling end e1 of the coupling member 241 is fixed in the second body 230 for coupling to the second body 230, so that the coupling member 241 synchronizes with the second body 230 while rotating relative to the base 210. Moreover, the coupling member 241 comprises two protrusions 241a and 241b.

The supporting member 242 is pivotally connected between the coupling member 241 and the second pivot section 212. The elastic member 243 is exemplified by a spring connected to the bearing between the coupling member 241 and the supporting member 242. The supporting member 242 comprises two guide tracks 242a and 242b and a first coupling member 242c. The two protrusions 241a and 241b of the coupling member 241 are respectively located in the two guide tracks 242a and 242b. The first coupling member 242c corresponds to a second coupling member 212c of the second pivot section 212. In the present embodiment of the invention, the first coupling member 242c is exemplified by a column and the second coupling member 212c is exemplified by a groove. The supporting end e2 of the supporting member 242 is coupled to the first body 220 in a way similar to pivotal connection. When the supporting member 242 is rotated, a force is applied to the first body 220 via the supporting end e2.

FIG. 3B illustrates the connection relationship between the elements of the adjusting apparatus 240 when the first body 220 and the second body 230 are closed together as shown in FIG. 2B. For the convenience of elaboration, the coupling end e1 and the supporting end e2 are omitted in FIG. 3B. Meanwhile, the relative angle between the second body 230 and the base 210 is 0 degree, that is, the coupling end e1 faces the +x direction. Besides, due to the coupling between the two protrusions 241a and 241b and the guide tracks 242a and 242b, the supporting member 242 tightly presses the coupling member 241, and the elastic member 243 is at a compressed state. Furthermore, the first coupling member 242c, which is a column, presses the surface S of the second pivot section 212 and not align with the second coupling member 212c yet.

FIG. 3C illustrates the connection relationship between the elements of the adjusting apparatus 240 when the user opens and rotates the second body 230 for 90 degrees for example. During the rotating for the second body 230 from 0 to 90 degrees, the supporting member 242 does not move along the y axis because the first coupling member 242c presses the surface S. That is, as the coupling member 241 rotates, the two protrusions 241a and 241b lead the supporting member 242 by means of the guide tracks 242a and 242b, so that the supporting member 242 synchronizes with the coupling member 241 and rotates. At the same time, the rotating supporting member 242 would lift the first body 220 as indicated in FIG. 2C from the supporting end e2. When the second body 230 rotates to 90 degrees, the first coupling member 242c and the second coupling member 212c are corresponding (aligned) to each other as indicated in FIG. 3C.

As indicated in FIG. 3D, if the user continues to rotate the second body 230, as the supporting member 242 is no longer pressed by the surface S in the +y direction, the rotating coupling member 241, through the coupling between the two protrusions 241a and 241b and the two guide tracks 242a and 242b, incorporates the elastic force of the elastic member 243 and applies a force to the supporting member 242 in the −y direction. That is, the supporting member 242 would not rotate synchronically with the coupling member 241 but horizontally tighten toward the second pivot section 212, so that the first coupling member 242c and the second coupling member 212c are engaged correspondingly. Thus, the supporting member 242 is fixed in the second pivot section 212 and the relative angle between the first body 220 and the base 210 is maintained at, for example, 7 degrees. When the supporting member 242 continues to shift toward left until completely press the surface S, the guide tracks 242a and 242b become to be vertical again, that is, parallel to the z axis, so that the coupling member 241 no longer applies any force to the supporting member 242. Therefore, once the second body 230 rotates over 90 degrees, the angle between the first body 220 and the base 210 would be kept regardless of further rotation.

To the contrary, when the user would like to close the electronic apparatus, the coupling member 241 of FIG. 3D rotates along with the second body 230 and applies a force to the supporting member 242 in the +y direction, so that the first coupling member 242c is separated from the second coupling member 212c and rotates to the state as shown in FIG. 3C from an over-90-degree angle. Next, the coupling member 241 continues to rotate to the state as shown in FIG. 3B. As disclosed above, the supporting member 242, not shifting along the y axis, synchronizes with the coupling member 241 rotating from 90 degrees to 0 degrees, so that the electronic apparatus 200 gets the closing state shown in FIG. 2B.

However, anyone who is skilled in the technology of the invention will understand that the technology of the invention is not limited thereto. For example, the relative placement between the supporting end e2 of the supporting member 242 and the first body 220; the corresponding angle between the first coupling member 242c and the second coupling member 212c and the maximum supporting angle of the first body 220 (7 degrees), all of which are not limited to as exemplified in the present embodiment of the invention, but can be adjusted according to actual needs of the electronic apparatus and ergonomic considerations. Moreover, when the first body 220 reaches the maximum supporting angle, the rotation angle of the second body 230 is not limited to 90 degrees either (relative to the base 210). Anyone who is skilled in the technology of the invention is able to take the number of protrusions and the curvature of the guide tracks into account so as to achieve a predetermined angle of rotation. However, the electronic apparatus is not limited to a notebook computer, and the design of the adjusting apparatus of the invention is applicable to any electronic apparatus having a closing and opening mechanism similar to that of the notebook computer.

The electronic apparatus disclosed in the preferred embodiment of the invention adopts the design of an adjusting apparatus for automatically adjusting the angle of the host body when the user opens or closes the monitor body. Compared with conventional notebook computer, the electronic apparatus of the invention has better dissipation effect and is more user-friendly. The user can quickly adjust the angle of the keyboard to create a suitable operating environment by opening or closing the monitor alone without any further manual adjustment.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus, comprising:
a base comprising a first pivot section and a second pivot section;
a first body and a second body disposed respectively at two ends of the base, wherein the first body and the second body are rotatable relative to the base; and
at least an adjusting apparatus, comprising:
a coupling member pivotally connected to the first pivot section and coupled to the second body, wherein the coupling member synchronizes with the second body while rotating relative to the base; and
a supporting member pivotally connected between the coupling member and the second pivot section and coupled to the first body, wherein when the second body rotates within the predetermined angle, the coupling member leads the supporting member to rotate and lift the first body so as to adjust the relative angle between the first body and the base.

2. The electronic apparatus according to claim 1, wherein the electronic apparatus is a notebook computer.

3. The electronic apparatus according to claim 1, wherein the first body comprises a keyboard module; the second body comprises a monitor.

4. The electronic apparatus according to claim 1, wherein when the second body rotates over the predetermined angle, the coupling member enables the supporting member to be fixed in the second pivot section and keep the relative angle between the first body and the base.

5. The electronic apparatus according to claim 4, wherein the supporting member comprises at least a guide track and a first coupling member, the second pivot section comprises a second coupling member, the coupling member comprises at least a protrusion capable of moving back and forth within the guide track so as to lead the supporting member to rotate, and when the second body rotates over the predetermined angle, the first coupling member and the second coupling member are correspondingly engaged for fixing the supporting member in the second pivot section.

6. The electronic apparatus according to claim 1, wherein the adjusting apparatus further comprises an elastic member connected between the coupling member and the supporting member.

\* \* \* \* \*